(12) United States Patent
King et al.

(10) Patent No.: US 11,156,833 B2
(45) Date of Patent: Oct. 26, 2021

(54) OPTICAL EXTENDER FOR VEHICLE HEADS UP DISPLAYS

(71) Applicants: Ford Global Technologies, LLC, Dearborn, MI (US); RHEINISCH-WESTFALISCHE TECHNISCHE HOCHSCHULE AACHEN (RWTH AACHEN UNIVERSITY), Aachen (DE)

(72) Inventors: Anthony Gerald King, Ann Arbor, MI (US); Matus Banyay, Frechen (DE); Patrick Badaru, Pulheim (DE); Michael Berens, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 16/505,153

(22) Filed: Jul. 8, 2019

(65) Prior Publication Data

US 2021/0011287 A1 Jan. 14, 2021

(51) Int. Cl.
*G03B 21/14* (2006.01)
*G02B 27/01* (2006.01)
*G03B 21/20* (2006.01)

(52) U.S. Cl.
CPC ..... *G02B 27/0101* (2013.01); *G02B 27/0149* (2013.01); *G03B 21/145* (2013.01); *G03B 21/208* (2013.01); *G02B 2027/015* (2013.01); *G02B 2027/0116* (2013.01)

(58) Field of Classification Search
CPC .... G03B 21/008; G03B 21/28; G03B 21/145; G03B 21/208; G03B 21/2013; G03B 21/2033; G02B 27/01; G02B 27/10; G02B 27/14; G02B 27/0101; G02B 27/0149; G02B 27/0172; G02B 27/0176; (Continued)

(56) References Cited

U.S. PATENT DOCUMENTS

| 7,031,067 B2 | 4/2006 | Voloschenko et al. |
| 8,031,406 B2 | 10/2011 | Chen |
| 9,851,560 B2 | 12/2017 | Chou et al. |

(Continued)

FOREIGN PATENT DOCUMENTS

JP  4670367 B2  4/2011

OTHER PUBLICATIONS

Nicolaus Hettler et al., *Novel Optics: Plastic Micro-Optics Cater to Automotive HUD Design*, 2014, 7 pages.

*Primary Examiner* — Sultan Chowdhury
(74) *Attorney, Agent, or Firm* — Frank Lollo; Eversheds Sutherland (US) LLP (57) ABSTRACT

Apparatus and method for designing an optical extender for a vehicle heads up display (HUD). An example vehicle includes a windshield and a HUD system. The HUD system includes an image source to provide a projection image and a main mirror to project the projection image onto the windshield. The image source and the main mirror define a light path. The HUD system also includes an optical extender between the main mirror and the windshield. The optical extender has a multi-polynomial top surface that modifies light in the light path to, when the light in the light path intersects the windshield, create an optical path wherein a virtual image of the projection image is visible from an eyebox defined within a cabin of the vehicle.

17 Claims, 7 Drawing Sheets

(58) Field of Classification Search
CPC ............ G02B 27/283; G02B 2027/011; G02B 2027/015; G02B 2027/0116; G02B 2027/0172
See application file for complete search history.

(56) References Cited

U.S. PATENT DOCUMENTS

| | | | |
|---|---|---|---|
| 2006/0209419 A1* | 9/2006 | Dobschal | G02B 27/0101 359/630 |
| 2013/0100524 A1 | 4/2013 | Magarill et al. | |
| 2016/0303974 A1* | 10/2016 | Yonetani | G02B 17/0621 |
| 2019/0346713 A1* | 11/2019 | Miyake | G02B 27/0149 |
| 2020/0186765 A1* | 6/2020 | Saracco | G02B 27/005 |
| 2020/0201037 A1* | 6/2020 | Yamamoto | G02B 5/0833 |

* cited by examiner

OPTICAL EXTENDER FOR VEHICLE HEADS UP DISPLAYS

TECHNICAL FIELD

The present disclosure generally relates to heads up displays for vehicles and, more specifically, optical extenders for vehicle heads up displays.

BACKGROUND

Increasingly, vehicles are being manufactured with heads up displays (HUDs). HUDs systems have an image source that projects an image (sometimes referred to as an "object") onto transparent surface, such as a screen or a windshield. The object projected on the surface (sometimes referred to as a "virtual image") appears to an observer to be projected a distance in front of the vehicle (sometimes referred to as the "projection distance"). The volume of space within which the virtual image is effectively viewable is sometimes referred to as an "eyebox." The size of the HUD system is related to (a) the size of the eyebox, (b) the size of the virtual image, and (c) the projection distance. Generally, HUDs systems use a curved mirror to control the size of the eyebox, the size of the virtual image, and the projection distance. Traditionally, increasing any one of those parameters requires increasing the size of the curved mirror.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for an optical extender for a vehicle heads up display (HUD). An example vehicle includes a windshield and a HUD system. The HUD system includes an image source to provide a projection image and a main mirror to project the projection image onto the windshield. The image source and the main mirror define a light path. The HUD system also includes an optical extender between the main mirror and the windshield. The optical extender has a multi-polynomial top surface that modifies light in the light path to, when the light in the light path intersects the windshield, create an optical path wherein a virtual image of the projection image is visible from an eyebox defined within a cabin of the vehicle.

An example HUD system includes an image source to provide a projection image and a main mirror to redirect and magnify the projection image towards an aspheric surface of the vehicle. The image source and the main mirror define a light path that extends to the aspheric surface. The HUD system also includes an optical extender between the main mirror and the aspheric surface within the light path. The optical extender has a multi-polynomial top surface that modifies light in the light path to, when the light in the light path intersects the aspheric surface, create an optical path wherein a virtual image of the projection image is visible from an eyebox defined within a cabin of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Heads up display (HUD) systems project an image onto a windshield or other screen (e.g., combiner glass) in front of a driver to produce a virtual image that appears to be in front of a vehicle. HUD systems are located within the instrument panel in the dashboard. However, the current HUD systems are relatively large, causing a lot of difficulty in packaging the HUD system in the instrument panel. For example, HUD systems can be seven to eight liters in volume. There are many vehicle components, such as the instrument cluster, ducts, a cross-car beam, and wiring, etc., also competing for the scarce space within the instrument panel. Typically, these HUD systems have a limited eyebox, a relatively short projection distance, and/or a relatively small virtual image. For example, the HUD system may have a projection distance of two meters. However, there is an increasing demand for larger eye boxes, longer projection distances, and larger virtual images. For example, there is an demand for a projection distance of fifteen meters. Traditionally, to meet this demand, the HUD system requires a larger curved mirror. As a result, the size of the HUD system becomes larger and it becomes untenable to package into the constrained instrument panel environment. For example, creating a traditional HUD system with a projection distance of fifteen meters would be approximately double the size of the HUD system with a projection distance of two meters. One attempt to solve this problem is with holographic waveguides. However, these holographic waveguides create problems with fringing and color matching which decrease the quality of the virtual image.

HUD systems include an image source, a fold mirror, a projection screen, and a main mirror (the curved mirror). Traditionally, the HUD system also includes a transparent cover between the main mirror and the windshield of the vehicle. The image source provides the object. The fold mirror bends the light from the image source to make the light path longer than the any one dimension inside the HUD system. The main mirror is an aspheric surface that is designed to complement the aspheric curvature of the windshield off which the light reflects to form the eyebox. The transparent cover is a curved surface that is designed to control stray light, collecting and reflecting it onto an absorber surface forward of the ray bundle exiting the HUD system.

As used here, "object" is the image that is produced by the image source. "Virtual image" is a projection of the object that appears as if it is in front of the vehicle. "Projected distance" is the distance between the driver and where the driver perceives that virtual image to be. For example, while the image may actually be projected onto the windshield, the driver may perceive the image to be seven meters from his or her head. "Light path" is the area encompassed by the light produced by the image source as it travels through the HUD system and intersects the windshield or other screen. The "eyebox" is the volume of space within which the virtual image is effectively viewable.

As describes below, the HUD system of the present disclosure uses an optical extender between the image source (and, in some examples, the other internal optical components of the HUD system such as the fold mirror, the projection screen and the main mirror, etc.) and an aspheric combiner (e.g., a windshield of the vehicle, a combiner glass, etc.). The optical extender modifies the optical performance of the internal optical components of the HUD system that creates the virtual image at the projected distance from the viewer, through the aspheric combiner. The optical extender increases the length of the projected distance and/or the size of the eyebox compared to a transparent cover. The shape of the optical extender modifies the path of the light that passes through it to alter the light path that is reflected in the internal optics of the HUD system. A top surface of the optical extender has a plurality of nadirs and/or apexes, not including nadirs or apexes at the edges of the optical extender. In some examples, the top surface of the optical extender has a plurality of nadirs and/or apexes on one axis and at least one nadir or apex on another axis.

The shape of the top surface of the optical extender depends on the geometry of the cabin of the vehicle, the desired eyebox size, and the desired projection distance. The follow summarizes determining the geometry of the top surface of the optical extender. A grid of field points is defined in a virtual image plane and a grid of field points is defined in an eyebox plane. The field points for the eyebox plane are pupil-sized apertures. Virtual lines connect each of the field points associated with the virtual image plane with a corresponding field point in the eyebox plane. Virtual rays are traced along the virtual lines until the virtual rays intersect the aspheric combiner. The virtual rays are traced into the internal optics of the HUD system to a display plane (e.g., the image source) based on a reflection of the virtual rays off of the aspheric combiner. The top surface of the optical extender is shaped so that the virtual rays converge at a coupled center field point on the display plane.

The coupled center field point is positioned on the display plain horizontally for two pupil positions that are centered in the eye box and are horizontally separated by a mean pupil distance (e.g., a mean pupil distance of 65 millimeters (mm)). The coupled field points on the display plane for the two pupil positions coincide; differences between the single spot positions of the field points on the display plane are minimized (e.g. the distance between pairs of adjacent points is equal to or less than a size of a pixel). From this position, an initial center point where each field point as seen from the two pupil positions is calculated. This initial center point is established as a target position for the center points resulting from the field points as seen from the other possible pupil positions in the eyebox grid plane. Because of the optics, the center points resulting from the ray bundles defined by the combinations of the different pupil positions and field points in the virtual image plane define an area around the initial center point. However, in defining the geometry of the top surface of the optical extender, this area is minimized.

This process is repeated to extend the projection distance by incrementally increasing the distance between the virtual plane and the eyebox plane. In some examples, the size of the virtual image is also incrementally increase. The result of this process is a multi-polynomial surface for the optical extender that creates an improved eyebox and projection distance without increasing the footprint of the internal optics of the HUD system.

Figure 1:
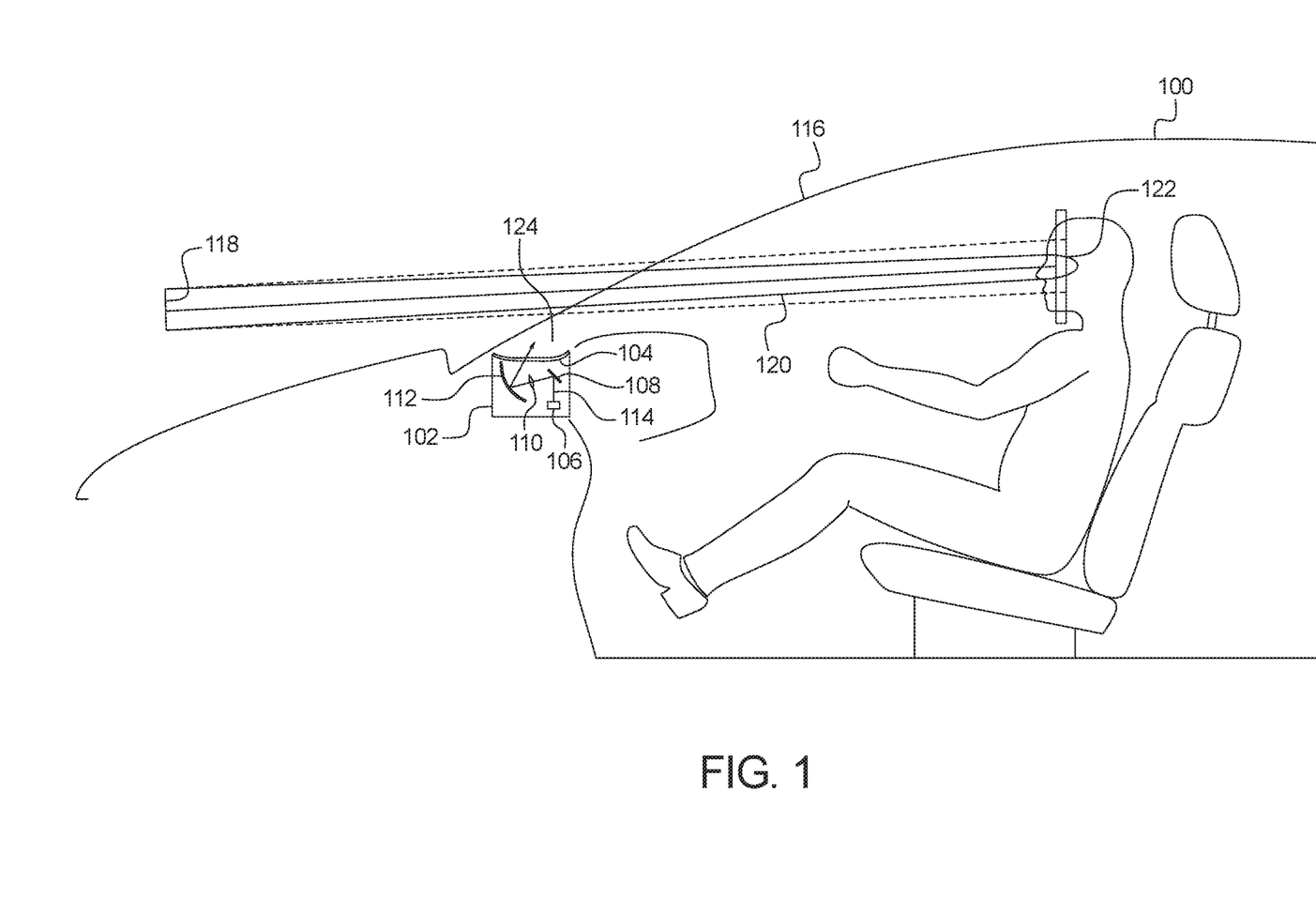
FIG. 1 illustrates a vehicle with a head up display (HUD) system with a transparent cover.

FIG. 1 illustrates a vehicle 100 with a head up display (HUD) system 102 with a transparent cover 104. The example HUD system 102 also includes an image source 106, a fold mirror 108, a projection screen 110, and a main mirror 112. The image source 106 displays (e.g., projects) an object (sometimes referred to as the "real image") and is the source of a light path 114. The fold mirror 108 bends the light path 114 from the image source 106. The fold mirror 108 is a planar mirror or an aspherical mirror. The main mirror 112 is an aspheric surface that is configured to complement the aspheric curvature of an aspheric combiner (e.g., the windshield 116). The projection screen 110 is a relay lens that forms an image of the object from the image source 106 at a focal distance from the aspheric combiner. The projection screen 110 facilitates correcting aberrations in the light path that affect parallax, accuracy and clarity of a virtual image 118. The main mirror 112 magnifies the light path 114. The main mirror 112 also directs the light path 114 to the aspheric combiner to create an optical path 120 such that a virtual image 118 appears to be projected along the optical path 120 from an eyebox 122 at a conventional projection distance ($D_{VC}$) from the eyebox 122. In some examples, the main mirror 112 is adjustable (e.g., rotatable) to change where the light path 114 intersects the aspheric combiner. The transparent cover 104 is a curved surface configured to control stray light. The transparent cover 104 collects and reflects the stray light onto a light trap and a glare trap.

The HUD system 102 is positioned within the instrument panel 124 of the vehicle 100. Because of size constraints (e.g., due to other instrumentation also in the instrument panel 124), As a result, the HUD system 102 of FIG. 1 has a limited size of the eyebox 122, a limited projection distance ($D_{VC}$), and a limited size of the virtual image 118. For example, the limited projection distance ($D_{VC}$) may be limited to two meters and the eyebox 122 may be 140 mm by 60 mm. This limits the ability of the HUD system 102 of FIG. 1 to be used for certain functions, such as augmented reality because, for example, the eyebox 122 severely restricts the location of the driver's head from where the virtual image 118 is viewable. Additionally, for example, the limited projection distance ($D_{VC}$) limits how much "depth" a virtual image can portray.

Figure 2:
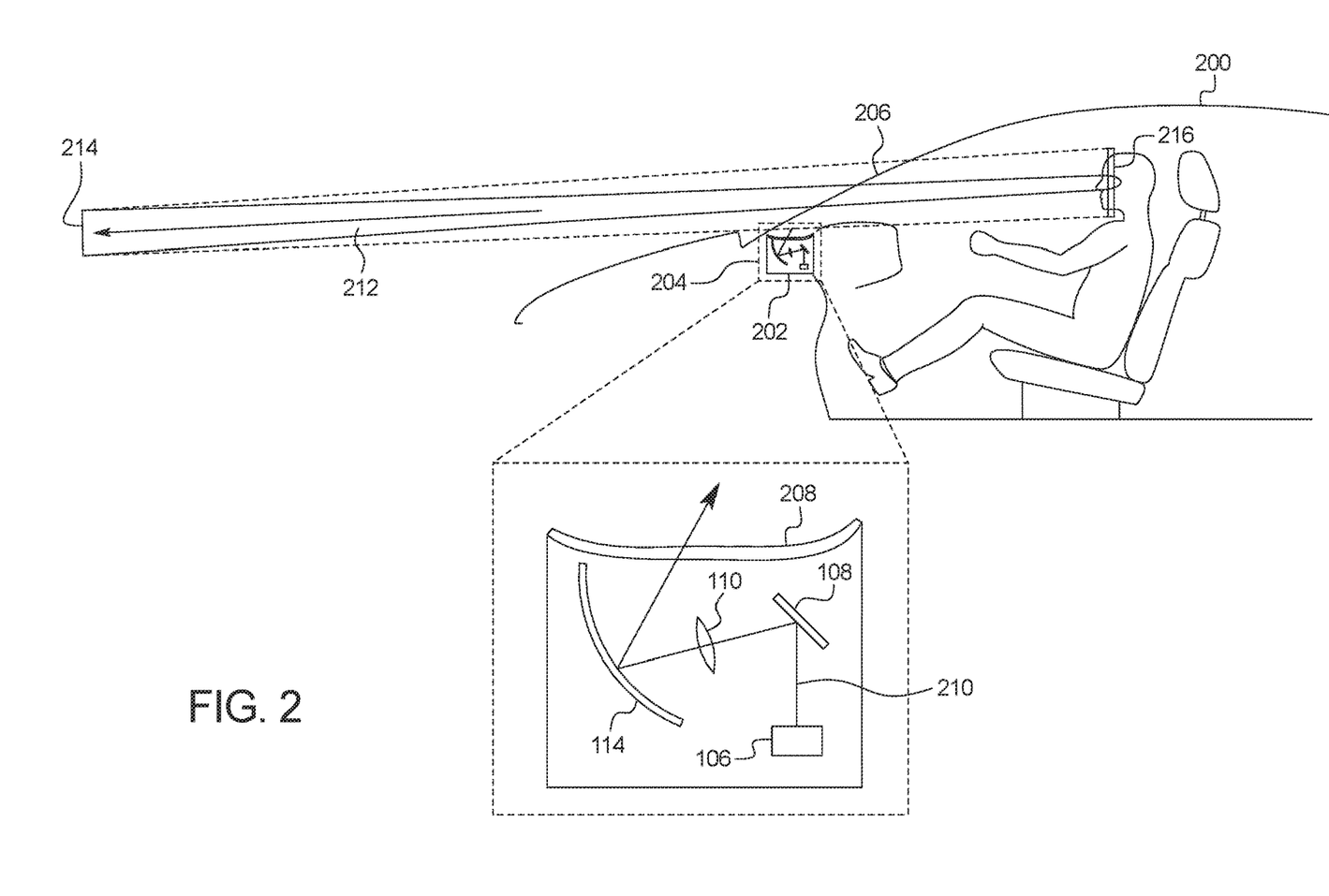
FIG. 2 illustrates a vehicle with a HUD system with an optical extender operating in accordance with the teachings of this disclosure.

FIG. 2 illustrates a vehicle 200 with a heads up display (HUD) system 202 operating in accordance with the teachings of this disclosure. The vehicle 200 may be a standard gasoline powered vehicle, a hybrid vehicle, an electric vehicle, a fuel cell vehicle, and/or any other mobility implement type of vehicle. The vehicle 200 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 200), or autonomous (e.g., motive functions are controlled by the vehicle 200 without direct driver input). In the illustrated example the vehicle 200 includes the HUD system 202 located in an instrument panel 204, and a windshield 206 (e.g., as the aspheric combiner). In some examples, the vehicle 200 includes a combiner glass panel extending vertically from the instrument panel 204 as the aspheric combiner.

The example HUD system 202 also includes an image source 106, a fold mirror 108, a projection screen 110, and a main mirror 112, and an optical extender 208. The image source 106 displays an object and is the source of a light path 210. The main mirror 112 also directs the light path 114 to the windshield 116 to create an optical path 212 such that a virtual image 214 appears to be projected along the optical path 212 from an eyebox 216 at an extended projection distance ($D_{VE}$). The optical extender 208 magnifies, reflects, and/or refracts the light in the light path 210 as the light path 210 passes through it.

Figure 3A:
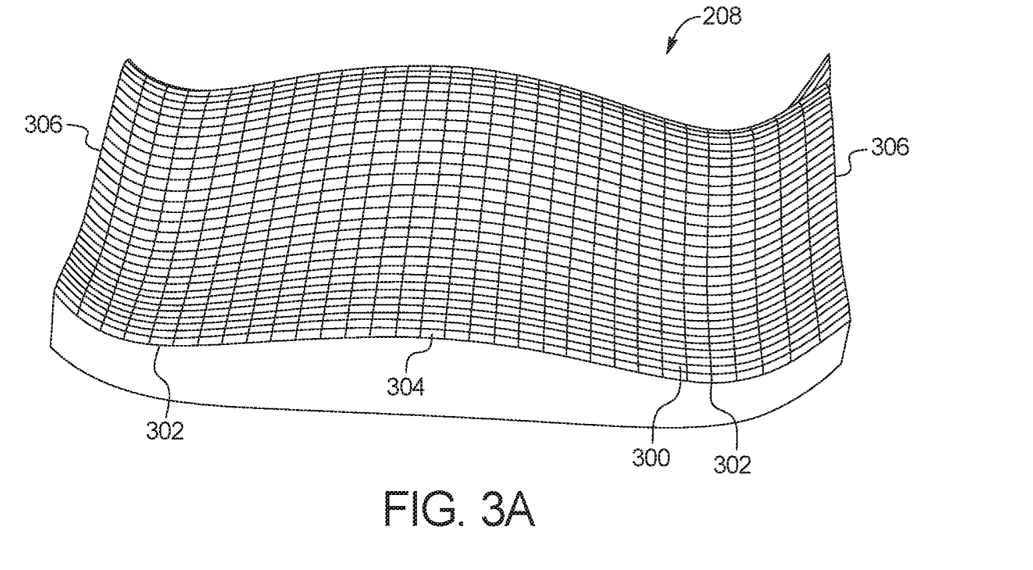
FIGS. 3A, 3B, and 3C are views of the optical extender of FIG. 2.
Figure 3B:
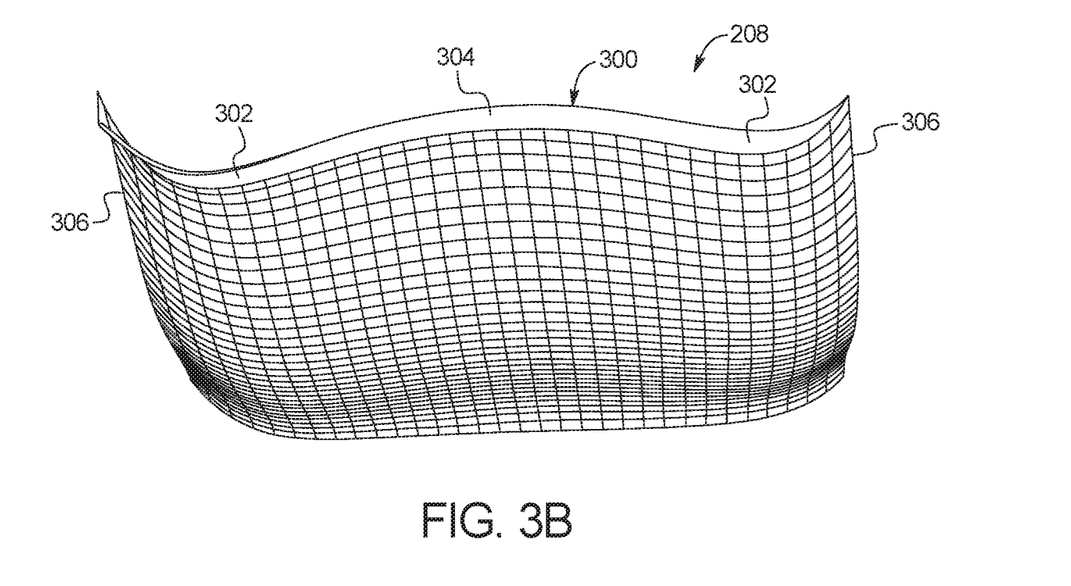
Figure 3C:
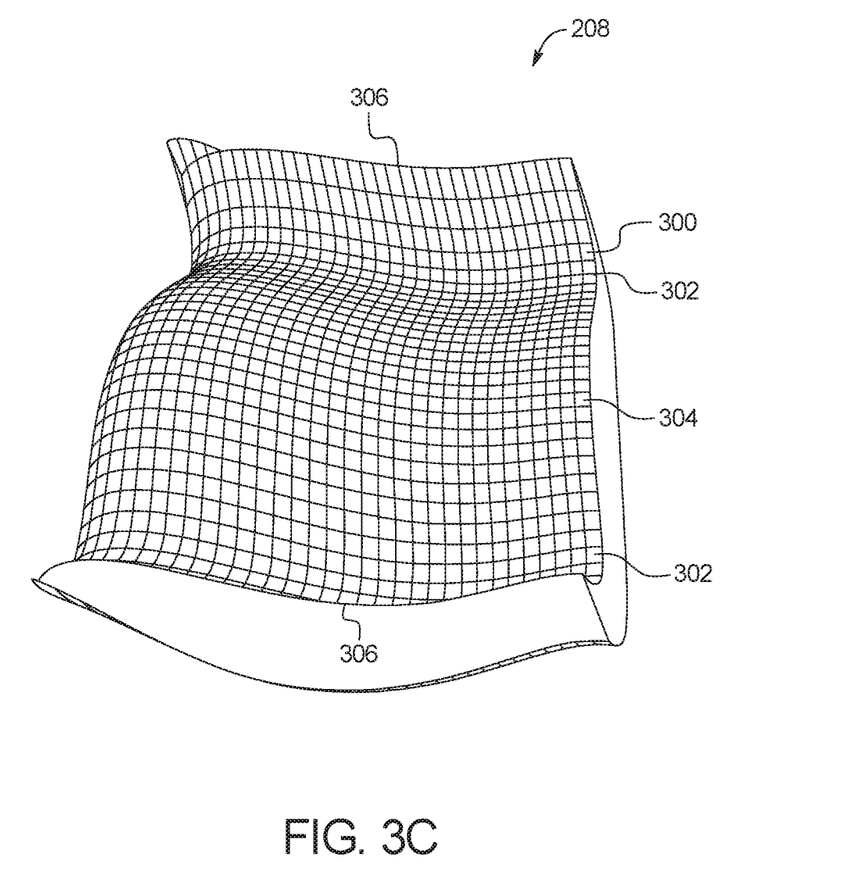

An example optical extender 208 is illustrated in FIGS. 3A, 3B, and 3C. A top surface 300 of the optical extender 208 has a multi-polynomial shape that is based on the position of the driver's head, the size of the eyebox 216, and the extended projection distance ($D_{VE}$). An example method to determine the shape of the optical extender 208 for a particular vehicle is discussed in connection with FIG. 5 below. In some examples, the optical extender 208 is made of a polymethyl methacrylate (PMMA) material and/or a polycarbonate (PC) material. For example, the optical extender 208 may be made of a single material (e.g., PMMA or PC) or different layers of multiple materials (e.g., PMMA and PC). In the illustrated example, the top surface 300 of the optical extender 208 includes a plurality of nadirs 302 and/or apexes 304 that are not at the edges 306 of the optical extender 208 (e.g., the edges of the optical extender 208 may have nadirs and/or apexes in addition to the plurality of nadirs 302 and/or apexes 304 of the top surface). In some examples, ones of the plurality of nadirs 302 and/or apexes 304 are on difference axes of the top surface 300. In some examples, the optical extender 208 does not have a uniform thickness as a result of the optimization. For example, the end of the optical extender 208 closer to the windshield 206 may be thinner than the end farther from the windshield 206.

A phenomenon called "lateral color error" (sometimes referred to as "transverse chromatic aberration") occurs when a refractive surface refracts different wavelengths of light (e.g., colors) at slightly different rates causing the focal point for the different wavelengths to be at different locations. In some examples, to prevent lateral color error, the image source 106 sequentially displays red, green, and blue images that have been shifted to reduce any in the HUD system 202. Additionally or alternatively, in some examples, the optical extender 208 includes a diffractive layer on the top surface 300 of the optical extender 208. Additionally or alternatively, in some examples, the optical extender 208 has multiple layers (e.g., two layers, three layers, etc.) made of different materials. For example, a two layer optical extender 208 may have a PMMA layer and a PC layer. As another example, a three layer optical extender 208 may have a PC layer sandwiched between two PMMA layers. In some such examples, at least one of the layers acts as an achromatic layer to bring different wavelengths (e.g., a wavelength corresponding to red and a wavelength corresponding to blue) to focus on the same point.

Figure 4A:
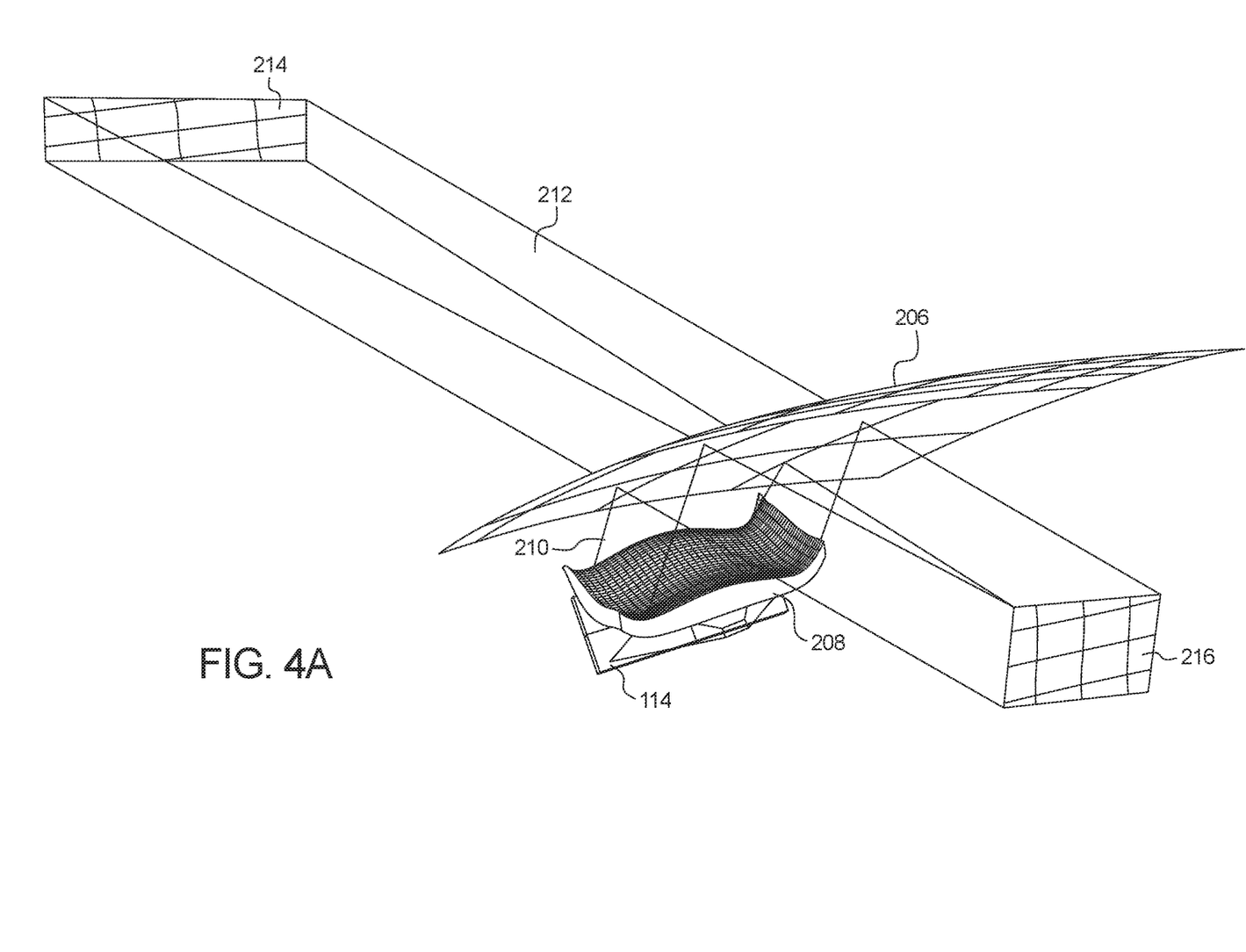
FIGS. 4A and 4B illustrate the optic path of the HUD system of FIG. 2 with the optical extender of FIGS. 3A, 3B, and 3C.
Figure 4B:
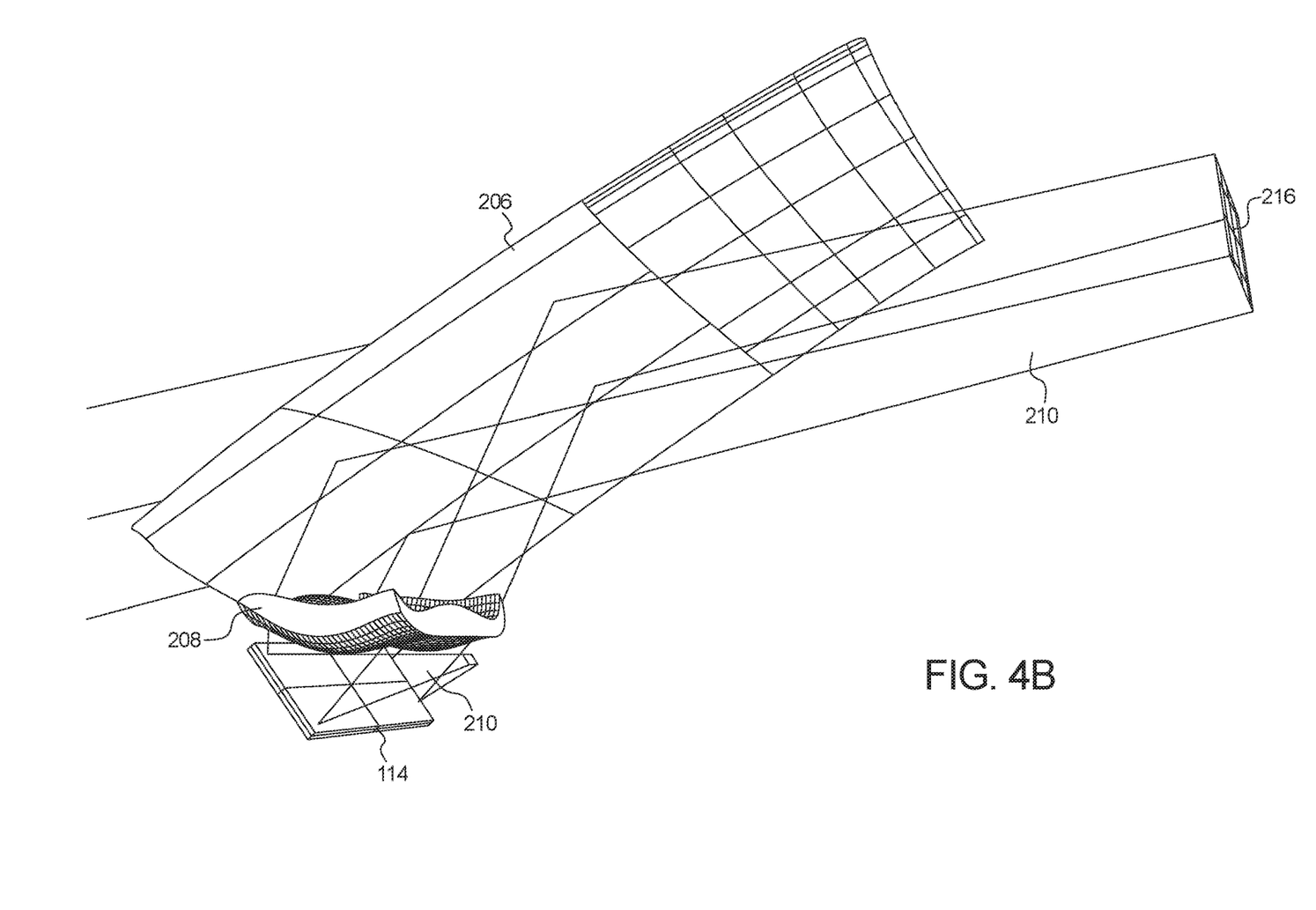

FIGS. 4A and 4B illustrate the optical extender 208 of FIGS. 2, 3A, 3B, and 3C in the light path 210 of the HUD system 202. In the illustrated examples, the light path 210 is reflected off of the main mirror 112 into the optical extender 208. The optical extender 208 modifies the light path 210 so that when the light path 210 intersects the windshield 116, a virtual optical path (e.g., the optical path 212) is created wherein, when the eyes of the driver are within the eyebox 216, the driver sees the virtual image 214 on the virtual plane 400 at the extended projection distance ($D_{VE}$). In some examples, the extended projection distance ($D_{VE}$) is at least 7 meters. In some examples, the width of the eyebox 216 is at least 140 mm.

Figure 5:
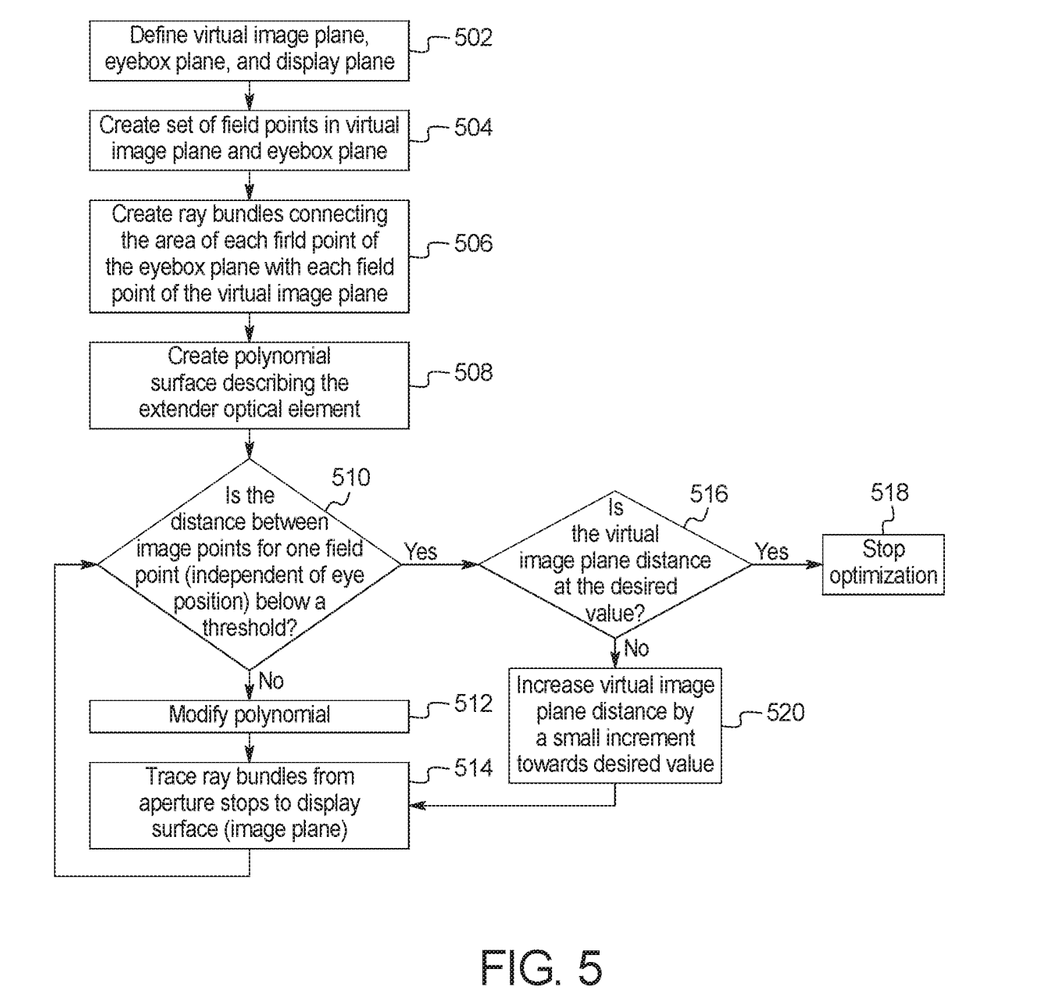
FIG. 5 is a flowchart of a method to determine the shape of the optical extender of FIGS. 3A, 3B, and 3C.

FIG. 5 is a flowchart of a method 500 to generate the shape of the optical extender 208 for a particular vehicle. Initially, at block 502, a virtual image plane (e.g., the plane the virtual image 214 is going to be projected on) an eyebox plane (e.g., the plane that defines the location of the eyebox 216), and a display plane (e.g., a plane defined by the image source 106). The virtual image plane is set at an initial distance that is between the aspheric combiner and the desired extended projection distance ($D_{VE}$). At block 504, a grid of field points is defined in a virtual image plane and a corresponding grid of field points is defined in an eyebox plane. The field points for the eyebox plane are defined to be pupil-sized apertures (e.g., 4 mm apertures, etc.). At block 506, virtual rays are traced into the internal optics of the HUD system to the display plane based on a reflection of the virtual rays off of the aspheric combiner. At block 508, an initial multi-polynomial surface is virtually created for the top surface 300 of the optical extender 208 (e.g., using Zernike polynomials in combination with a power series). At block 510, the light path from the eyebox plane is traced through the initial multi-polynomial surface and it is determined whether the resulting distance between image points on the display plane for pairs of field points in the eyebox plane are below a threshold distance (e.g., the size of a pixel). When the pairs of field points in the eyebox plane are not below a threshold distance, the method continue at block 512. Otherwise, when the pairs of field points in the eyebox plane are below a threshold distance, the method continues at block 516.

At block 512, the virtual multi-polynomial surface is modified. When modifying the virtual multi-polynomial surface, the modifications are made such that changes do not cause the surfaces of intersect with the ray bumbles within the original optical system (e.g., by not varying specific coefficients or limiting the movement of control polyhedrons for splines, etc.). The objective function to modify the virtual multi-polynomial surface includes multiple parts A target center point is defined on the display plane using the ray traces of two grid points that are centered in the eyebox plane that are horizontally separated by a mean pupil distance (e.g., 65 mm). This target center point is the target location for additional center points defined by combinations of two grid points on the eyebox plane that are the mean pupil distance apart. Because of the optics, these additional center points define an area around the target centerpoint. However, in defining the geometry of the virtual multi-polynomial surface, this area is minimized. In some examples, a penalty is added into the objective function to keep the distance between the two surfaces along the ray traces transmitted through the virtual multi-polynomial surface positive (as to prevent the virtual multi-polynomial surface from self-intersecting). In some examples, a penalty is added into the objective function to prevent the virtual multi-polynomial surface from intersecting a plane defined the upper housing of the HUD system 202 so that the resulting top surface 300 of the optical extender 208 is not within the housing of the HUD system 202.

At block 514, the virtual rays from the eyebox plane are traced into the internal optics of the HUD system to the display plane based on a reflection of the virtual rays off of the aspheric combiner and passing through the modified virtual multi-polynomial surface. The method then returns to block 510.

At block 516, it is determines whether the position of the virtual image plane is at the desired distance. When the position of the virtual image plane is at the desired distance, the method continues to block 518. Otherwise, when the position of the virtual image plane is not at the desired distance, the method continues to block 520. At block 518, the method ends and the resulting virtual multi-polynomial surface is the shape of the top surface 300 of the optical extender 208 for the particular vehicle. At block 520, the distance of the virtual image plane from the eyebox plane is incrementally increased. Additionally or alternatively, in some examples, the size of the virtual image plane is incrementally increased. The method then returns to block 514.

The flowchart of FIG. 5 is representative of machine readable instructions stored in memory that comprise one or more programs that, when executed by a processor, cause a computing platform (e.g., a computer, a workstation, a server, etc.) to, based on initial parameters set by a designer, design the optical extender 208 of FIGS. 2, 3A, 3B, and 3C. Further, although the example program(s) is/are described with reference to the flowchart illustrated in FIG. 5, many other methods of implementing the design of the optical extender 208 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a windshield; and
   a heads up display system including:
   an image source to provide a projection image;
   a main mirror to project the projection image onto the windshield, the image source and the main mirror defining a light path; and
   an optical extender between the main mirror and the windshield, the optical extender having a multi-polynomial top surface that modifies light in the light path to, when the light in the light path intersects the windshield, create an optical path wherein a virtual image of the projection image is visible from an eyebox defined within a cabin of the vehicle,
   wherein the optical extender includes a diffractive layer on the multi-polynomial top surface.

2. The vehicle of claim 1, wherein the optical path defines a projection distance from the eyebox to a perceived location of the virtual image in front of the vehicle.

3. The vehicle of claim 2, wherein the projection distance is at least seven meters.

4. The vehicle of claim 1, therein the multi-polynomial top surface of the optical extender has an apex and a nadir.

5. The vehicle of claim 1, wherein the multi-polynomial top surface of the optical extender has a plurality of at least one of apexes or nadirs.

6. The vehicle of claim 1, wherein the optical extender does not have a uniform thickness.

7. The vehicle of claim 6, wherein a thickness of the optical extender decreases from a first edge to a second edge of the optical extender, the second edge of the optical extender being closer to the windshield.

8. The vehicle of claim 1, wherein the multi-polynomial top surface is configure for the vehicle.

9. The vehicle of claim 1, wherein the optical extender includes a first layer made of a first material and a second layer made of a second material, the second material being different than the first material.

10. The vehicle of claim 9, wherein the first layer is an achromatic layer.

11. A heads up display system for a vehicle comprising:
    an image source to provide a projection image;
    a main mirror to redirect and magnify the projection image towards an aspheric surface of the vehicle, the image source and the main mirror defining a light path that extends to the aspheric surface; and
    an optical extender between the main mirror and the aspheric surface within the light path, the optical extender having a multi-polynomial top surface that modifies light in the light path to, when the light in the light path intersects the aspheric surface, create an optical path wherein a virtual image of the projection image is visible from an eyebox defined within a cabin of the vehicle,
    wherein the optical extender includes a first layer made of a first material and a second layer made of a second material, the second material being different than the first material and wherein the first layer is an achromatic layer.

12. The heads up display system of claim 11, wherein the optical path defines a projection distance from the eyebox to a perceived location of the virtual image in front of the vehicle.

13. The heads up display system of claim 12, wherein the projection distance is at least seven meters.

14. The heads up display system of claim 11, therein the multi-polynomial top surface of the optical extender has an apex and a nadir.

15. The heads up display system of claim 11, wherein the multi-polynomial top surface of the optical extender has a plurality of at least one of apexes or nadirs.

16. The heads up display system of claim 11, wherein the optical extender does not have a uniform thickness.

17. The heads up display system of claim 16, wherein a thickness of the optical extender decreases from a first edge to a second edge of the optical extender, the second edge of the optical extender being closer to the aspheric surface.

\* \* \* \* \*